United States Patent

[11] 3,616,931

[72] Inventor Robert J. Zievers
 1535 Carnation Way, Upland, Calif. 91786
[21] Appl. No. 21,093
[22] Filed Mar. 19, 1970
[45] Patented Nov. 2, 1971

[54] BELT-TYPE CENTRIFUGAL FILTER
 6 Claims, 3 Drawing Figs.
[52] U.S. Cl. .................................................. 210/370,
 210/380, 210/DIG. 4
[51] Int. Cl. ...................................................... B01d 33/04
[50] Field of Search............................................ 210/370,
 380, 385, DIG. 4

[56] References Cited
 UNITED STATES PATENTS
3,089,596 5/1963 O'Brien et al.................. 210/369

3,397,792 8/1968 Serrell.......................... 210/370

Primary Examiner—Samih N. Zaharna
Attorney—Harris, Kiech, Russell & Kern

ABSTRACT: A belt-type centrifugal filter comprising endless, foraminous filter belt means trained around inlet, outlet and guide pulleys rotatable about parallel axes, opposite sides of the belt means respectively engaging the inlet and outlet pulleys. The inlet pulley is hollow and is provided with a foraminous periphery, and the material to be filtered is delivered to the interior of the inlet pulley. The solids collect on the side of the belt means which is in engagement with the inlet pulley, and are centrifugally ejected from the belt means as it negotiates the outlet pulley. A conveyor receives the centrifugally ejected solids from the outlet pulley, and a scraper removes the solids from this conveyor.

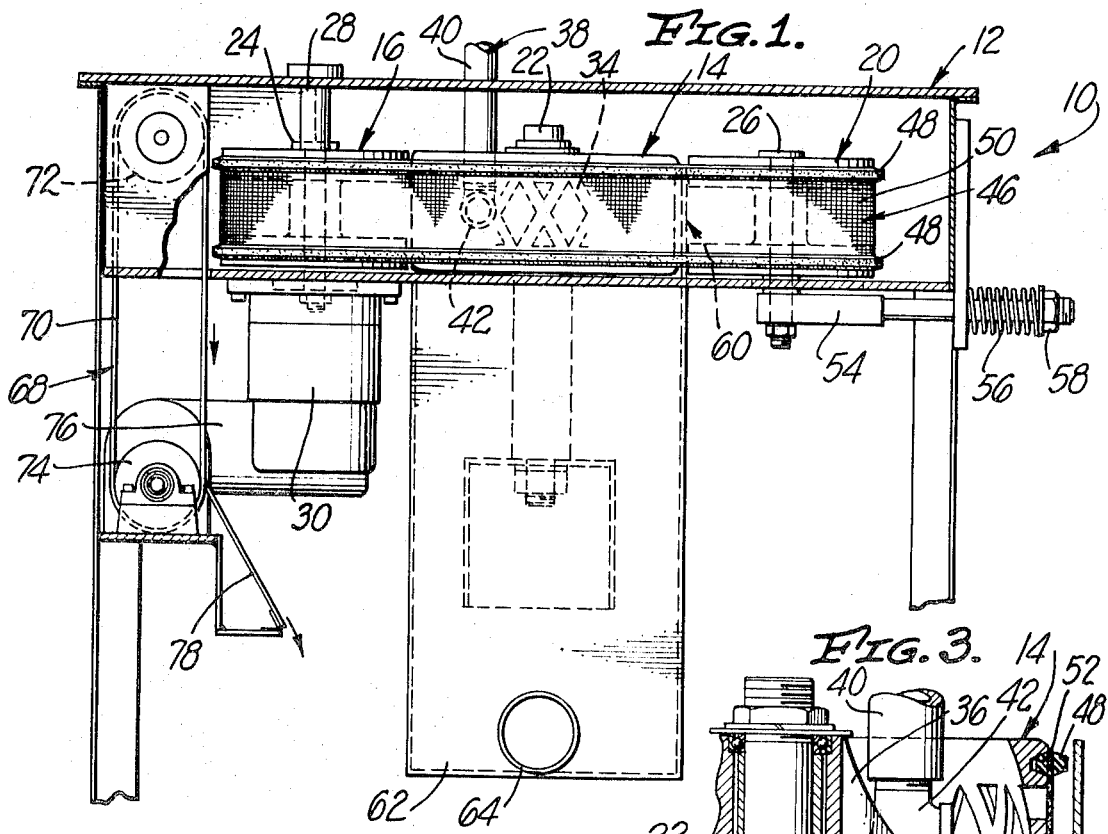
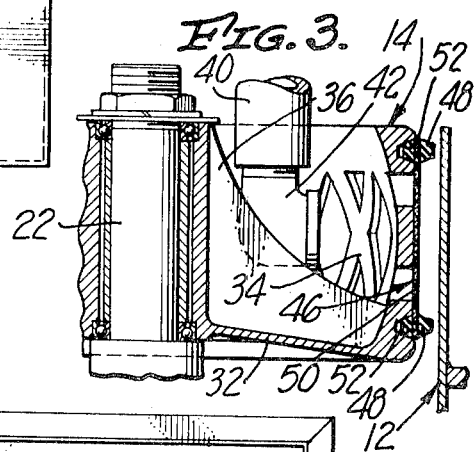
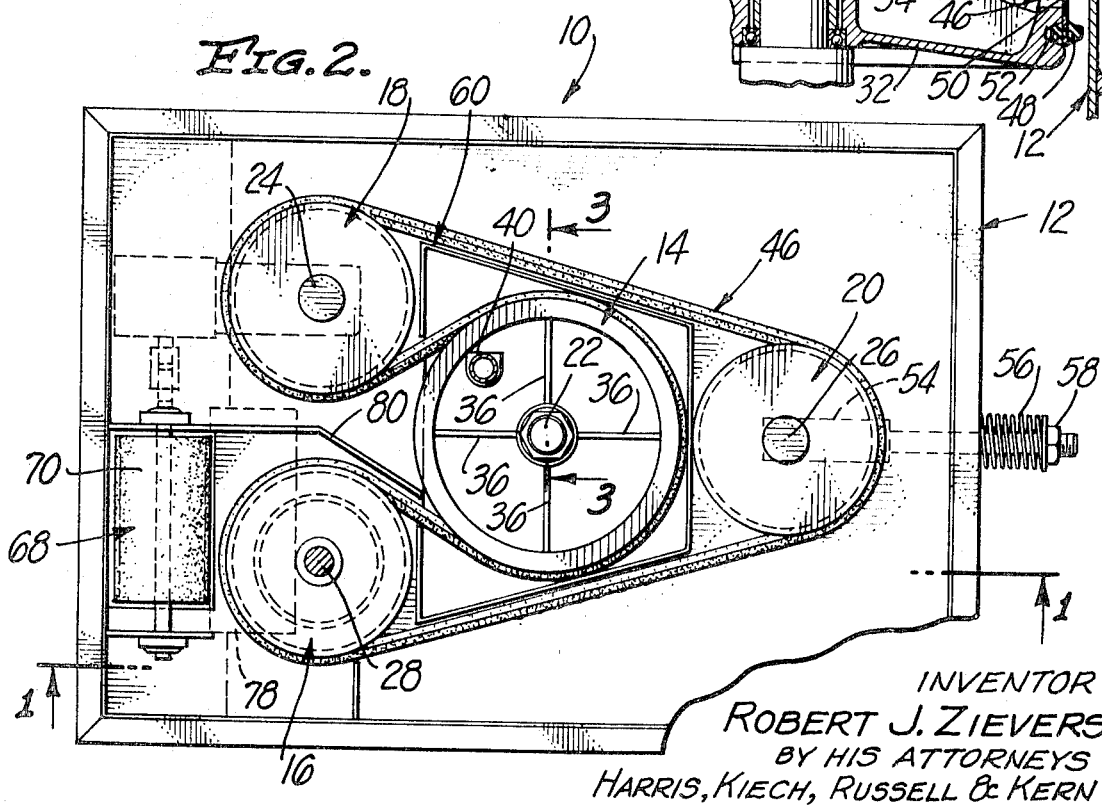

BELT-TYPE CENTRIFUGAL FILTER

BACKGROUND OF INVENTION

The present invention relates in general to a centrifugal filter and, more particularly, to a filter of this nature wherein the material to be filtered is delivered to one side of an endless, foraminous belt means at an inlet station, and wherein the filter cake is centrifugally ejected from the belt means at an outlet station.

A centrifugal device of the foregoing general nature is disclosed in U.S. Pat. No. 3,397,792, issued Aug. 20, 1968 to John J. Serrell, and includes: a supporting structure; inlet, outlet and guide pulleys mounted on the supporting structure for rotation about spaced, parallel axes; endless, foraminous belt means trained around the pulleys with opposite sides of the belt means respectfully engaging the inlet and outlet pulleys; means for introducing a material from which solids are to be removed between the belt means and the inlet pulley; and means for receiving the solids from the belt means upon centrifugal ejection of the solids as the belt means negotiates the outlet pulley. The apparatus of the Serrell patent requires some means, such as a nozzle, for introducing the material from which solids are to be removed between the belt means and inlet pulley.

SUMMARY AND OBJECTS OF INVENTION

General objects of the invention are to provide a belt-type centrifugal filter, or the like, which incorporates various improvements on the device hereinbefore discussed.

More particularly, a primary object of the invention is to provide an inlet pulley which is hollow and which is provided with a foraminous periphery engaged by the belt means. Another related primary object of the invention is to deliver the material to be filtered to the interior of the inlet pulley.

With the foregoing construction, the material to be filtered passes through the foraminous periphery of the inlet pulley into engagement with the side of the belt means in contact therewith, the solids being retained by the belt means and the filtrate, usually a liquid, passing through the belt means. Thus, with the present invention, it is merely necessary to deposit the material to be filtered in the inlet pulley, which is an important feature.

Another object of the invention is to provide a conveyor positioned adjacent the outlet pulley to receive solids centrifugally ejected from the belt means as it negotiates the outlet pulley, and to provide scraper means for removing the solids from the filter cake conveyor.

Another and important object of the invention is to provide a belt means having laterally spaced endless belts interconnected by an endless foraminous web disposed therebetween, each pulley being provided with longitudinally spaced peripheral grooves respectively receiving the belts therein. A related object is to provide a belt means of this nature wherein the belts project from opposite sides of the foraminous web, the web and the belts thus cooperating to provide a channel for retaining the solids therein as they are transported from the inlet pulley to the outlet pulley.

The foregoing objects, advantages, features and results of the present invention, together with various other objects, advantages, features and results thereof which will be evident to those skilled in the belt-type centrifugal filter art in the light of this disclosure, may be achieved with the exemplary embodiment of the invention illustrated in the accompanying drawing and described in detail hereinafter.

DESCRIPTION OF DRAWING

FIG. 1 is a view, partially in vertical section and partially in side elevation, of a belt-type centrifugal filter, or the like, which embodies the invention, FIG. 1 being taken as indicated by the arrowed line 1—1 of FIG. 2;

FIG. 2 is a plan view of the apparatus of FIG. 1; and

FIG. 3 is an enlarged, fragmentary sectional view taken as indicated by the arrowed line 3—3 of FIG. 2 of the drawing.

DESCRIPTION OF EXEMPLARY EMBODIMENT OF INVENTION

Referring to the drawing, the belt-type centrifugal filter of the invention which is illustrated therein is designated generally by the numeral 10 and includes a suitable supporting structure 12 having mounted thereon for rotation about vertical axes an inlet pulley 14, an outlet pulley 16 and guide pulleys 18 and 20. In the particular construction illustrated, the outlet and guide pulleys 16, 18 and 20 are arranged in a triangular pattern and the inlet pulley 14 is located within this triangle.

The inlet and guide pulleys 14, 18 and 20 are suitably rotatably mounted on axles 22, 24 and 26 carried by the supporting structure 12. The outlet pulley 16 is carried by a shaft 28 rotatably mounted on the supporting structure 12 and is driven by a motor 30 carried by the supporting structure.

The inlet pulley 14 is hollow and, more specifically, basket shaped, and is provided with an outwardly and downwardly sloping bottom wall 32, FIG. 3, and with a foraminous peripheral wall 34. The latter is rendered foraminous by providing it with a plurality of openings of any suitable size and shape. The interior of the inlet pulley 14 is preferably divided into four quadrants by circumferentially spaced partitions 36.

The centrifugal filter 10 includes means 38 for delivering a material to be filtered to the interior of the inlet pulley 14. In the construction illustrated, the material delivering means 38 comprises simply a vertical conduit 40 terminating within the inlet pulley 14 in a radially outwardly oriented elbow 42. The material discharged from the elbow 42 moves outwardly through the foraminous peripheral wall 34 under the influence of centrifugal force, assisted by the downward and outward slope of the bottom wall 32.

Trained around the inlet, outlet and guide pulleys 16, 18, 20 and 22 in an endless, foraminous filter belt means 46 comprising two laterally spaced endless belts 48 interconnected by an endless foraminous web 50 disposed therebetween. The web 50 may be formed of any desired material, such as filter cloth, wire mesh, or the like. The belts 48 project from both sides of the web 50 and are respectively disposed in complementary grooves in each of the pulleys 14, 16, 18 and 20, the grooves in each pulley being spaced apart longitudinally thereof. The belt grooves in the inlet pulley 14 are shown in FIG. 3 and are designated by the numeral 52.

To adjust the tension in the filter belt means 46, the axle 26 for one of the guide pulleys 20 is mounted on a slide member 54 which shifts the pulley 20 toward and away from the other pulleys. This slide member is spring loaded, by means of a compression spring 56, in a direction to maintain tension in the filter belt means 46, the degree of such tension being adjustable by means of a nut 58 threaded on the slide member and acting on the spring 56.

It will be noted that one side of the filter belt means 46 engages the inlet pulley 14, and that the other side of the filter belt means engages the outlet pulley 16, and incidentally the guide pulleys 18 and 20. With this construction, when a material to be filtered is delivered to the interior of the inlet pulley 14 through the delivery means 38, the solids are collected on the side of the filter belt means 46 in engagement with the inlet pulley, the projecting belts 48 forming a channel which insures retention of the solids. The filtrate, usually a liquid, passes through the web of the filter belt means 46 and impinges on the walls of a guard means 60 having an angular extent around the inlet pulley 14 of the order of 270°. The liquid passing through the filter web 50 and impinging on the walls of the guard means 60 drains downwardly into a sump 62, FIG. 1, from which it may be withdrawn through an outlet 64.

As each solids-carrying portion of the filter belt means 46 moves from the inlet pulley 14 to the outlet pulley 16, the solids-carrying side of the filter belt means becomes the outer side, with reference to the outlet pulley. Consequently, centrifugal force ejects the solids from the filter belt means 46 as it negotiates the outlet pulley 16.

The centrifugally ejected filter cake impinges on a vertically oriented conveyor 68 having the form of a conveyor belt 70 trained around upper and lower rolls 72 and 74, the lower roll being driven by a motor 76. The solids from the filter belt means 46 impinge on the downwardly moving run of the conveyor belt 70 and are removed therefrom by a scraper means 78. A guard means 80 extends from the conveyor 68 toward the inlet pulley 14 and serves to intercept any filter cake which is not projected directly toward the conveyor belt 70. Such intercepted solids can be permitted to drop downwardly for disposal along with the solids removed by the scraper means 78.

It is thought that the overall operation of the centrifugal filter 10 of the invention will be clear from the foregoing so that a further description is not necessary. Although an exemplary embodiment of the invention has been disclosed for purposes of illustration, it will be understood that various changes, modifications and substitutions may be incorporated in such embodiment without departing from the spirit of the invention as defined by the claims appearing hereinafter:

I claim:

1. In a belt-type centrifugal filter, or the like, the combination of:
    a. a supporting structure;
    b. inlet, outlet and guide pulleys mounted on said supporting structure for rotation about spaced, parallel axes;
    c. said inlet pulley being hollow and having a foraminous periphery;
    d. endless, foraminous filter belt means trained around said pulleys;
    e. opposite sides of said belt means engaging said inlet and outlet pulleys, respectively; and
    f. means for delivering a material to be filtered to the interior of said inlet pulley.

2. A belt-type centrifugal filter, or the like, as set forth in claim 1 wherein said belt means comprises laterally spaced endless belts interconnected by an endless foraminous web disposed therebetween, each of said pulleys being provided with longitudinally spaced peripheral grooves in which said belts are disposed, respectively.

3. A belt-type centrifugal filter, or the like, according to claim 1 including a conveyor positioned adjacent said outlet pulley to receive solids centrifugally ejected from said belt means as it negotiates said outlet pulley.

4. A belt-type centrifugal filter, or the like, as defined in claim 3 including scraper means for removing solids from said conveyor.

5. A belt-type centrifugal filter, or the like, according to claim 4 wherein the axes of rotation of said pulleys are vertical and wherein said conveyor is vertically oriented.

6. A belt-type centrifugal filter, or the like, as set forth in claim 2 wherein said belts are connected to the respective edges of said web and project from both sides thereof.